No. 633,652. Patented Sept. 26, 1899.
F. LATIMER.
TIRE FOR VEHICLE WHEELS.
(Application filed Apr. 3, 1899.)
(No Model.)
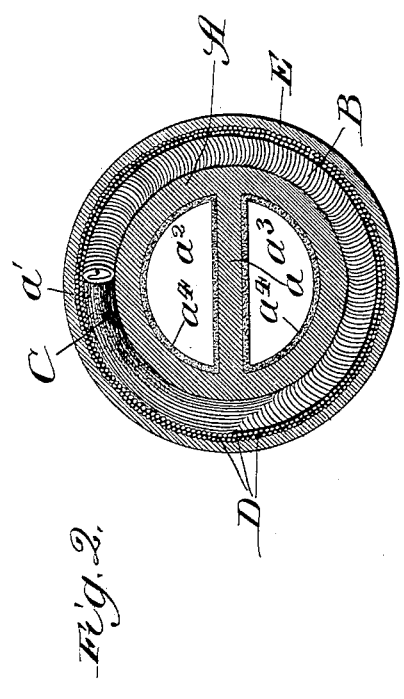
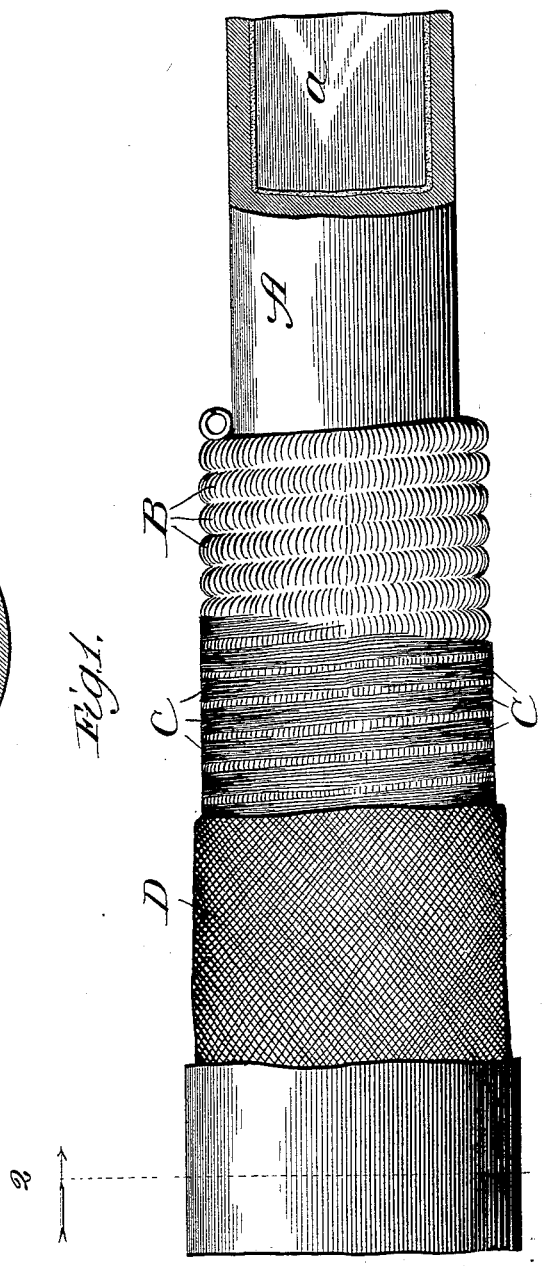
Witnesses:
Inventor:
Frank Latimer,

UNITED STATES PATENT OFFICE.

FRANK LATIMER, OF HUNTLEY, ILLINOIS.

TIRE FOR VEHICLE-WHEELS.

SPECIFICATION forming part of Letters Patent No. 633,652, dated September 26, 1899.

Application filed April 3, 1899. Serial No. 711,519. (No model.)

*To all whom it may concern:*

Be it known that I, FRANK LATIMER, of Huntley, Illinois, have invented certain new and useful Improvements in Tires for Vehicle-Wheels, of which the following is a specification.

My invention relates particularly to that class of tires for vehicle-wheels known as "cushion-tires"—tires in which a cushioning material or materials are used and in which a space or spaces are left for the purpose of providing for and permitting the displacement of the cushioning material.

The object of my invention is to provide a simple, economical, and efficient cushion-tire for vehicle-wheels; and the invention consists in the features, combinations, and details of construction hereinafter described and claimed.

In the accompanying drawings, Figure 1 is a sectional broken view of a portion of a tire constructed in accordance with my improvements, and Fig. 2 a cross-sectional view taken on line 2 of Fig. 1.

In constructing a tire in accordance with my improvements I make an inner tube or "core" A of the desired diameter and length and which is preferably formed of rubber or other similar cushioning material. It is well known in this art that where a hollow tube is used as the core of a tire when displacement takes place the tire is usually flattened out so as to bulge out the sides considerably and is therefore liable to be cut by the rim, and where metal strips or springs are used this abnormal displacement which takes place results in trituration of the contiguous surfaces and the rapid deterioration of the tire. In order to prevent this objectionable feature, I provide the inner core of the tire with what I call a "strut" portion $a$, which extends diametrically across the same, so that when pressure is applied to the "tread" $a'$ of the tire a depression is permitted to take place, while very little expansion takes place. This strut portion divides the inner core into two longitudinal chambers $a^2$ and $a^3$, each of which is provided with a lining $a^4$ of textile fabric or other similar material.

To assist in the cushioning effect of the tire and in lengthening the life of the same, I provide a helical spring B, which is preferably wound around the core, as shown in Fig. 1, so as to form a compound spring. Between the coils of this compound spring are wound silk or linen threads C, coated or provided with a solution of tacky rubber, which fills all the space between the springs. Outside of these springs and the helical windings of thread or similar element I provide a second layer of rubber-coated silk or linen threads D, which are wound the length of the tire in one direction and then back—that is, instead of being wound around helically and in contiguous coils, like a helix, so as to cover all the space, it is wound perhaps once or twice around the springs the entire length of the tire—say fourteen feet—and then back again, and so on back and forth until the springs are completely covered by a layer of threads crossing each other in many places in a crisscross manner—not like a woven fabric, but simply by independent threads.

To form the outer casing, a sheath E, formed of rubber or similar material, is molded around the tire in any of the usual manners and the whole vulcanized together in one operation.

The advantages incident to a tire constructed in accordance with my improvements are, first, that the construction of the inner core prevents undue abnormal distortion of the tire and minimizes the danger of rim-cutting, and, second, the peculiar windings of the two layers of threads embed the spring in a fabric of such construction that the danger of cutting by the springs is reduced to a minimum.

I claim—

1. In a tire of the class described, an outer sheath or casing, a spring or springs inside the casing and the inner tube or hollow core provided with a strut extending diametrically across the same to prevent undue distortion of the tire, substantially as described.

2. In a tire of the class described, the combination of an outer sheath or casing, an inner tube or core, a helically-coiled spring wound around the inner tube or core so as to provide a compound helically-wound spring, rubber-covered threads helically wound around the spring, and rubber-covered threads wound back and forth around the spring and helical threads and between them and the outer sheath or casing so as to provide a complex crisscross covering for the springs, substantially as described.

3. In a tire of the class described, the combination of an outer sheath or casing, an inner tube or hollow core provided with a diametrical "strut," a helically-coiled spring wound around the inner tube or core so as to provide a compound helically-wound spring, rubber-covered threads helically wound around the spring, rubber-covered threads wound back and forth around the spring and helical threads and between them and the outer sheath or casing so as to provide a complex crisscross covering for the springs, substantially as described.

FRANK LATIMER.

Witnesses:
　　THOMAS F. SHERIDAN,
　　THOMAS B. MCGREGOR.